United States Patent [19]
Morita

[11] Patent Number: 6,119,095
[45] Date of Patent: Sep. 12, 2000

[54] SYSTEM FOR PLANNING AND REVISING AN ITINERARY BASED ON INTENDED TRAVEL TIME AND EXPECTED CONSUMPTION TIME

[75] Inventor: Makoto Morita, Mishima, Japan

[73] Assignee: Toyota Jidosha Kabushiki Kaisha, Toyota, Japan

[21] Appl. No.: 08/785,985

[22] Filed: Jan. 21, 1997

[30] Foreign Application Priority Data

Jan. 22, 1996 [JP] Japan .................................. 8-008669

[51] Int. Cl.[7] .................................................. G06F 17/60
[52] U.S. Cl. ........................................................ 705/5
[58] Field of Search .............................. 701/5, 200, 201, 701/202, 117, 210; 705/9, 6, 7, 8, 5

[56] References Cited

U.S. PATENT DOCUMENTS

| | | | |
|---|---|---|---|
| 4,796,189 | 1/1989 | Nakayama et al. | 701/209 |
| 4,926,336 | 5/1990 | Yamada | 701/202 |

(List continued on next page.)

FOREIGN PATENT DOCUMENTS

| | | |
|---|---|---|
| 567992 | 11/1993 | European Pat. Off. |
| 638887 | 2/1995 | European Pat. Off. |
| 660289 | 6/1995 | European Pat. Off. |
| 669586 | 8/1995 | European Pat. Off. |
| 4-213761 | 8/1992 | Japan . |
| 5-313583 | 11/1993 | Japan . |
| 7-55484 | 3/1995 | Japan . |

OTHER PUBLICATIONS

Patent Abstract of Japan, vol. 96, No. 001, May 1996 re–JP–A 08 005391.

Patent Abstract of Japan, vol. 017, No. 519 (P–519), Sep. 1993, re JP–A 05 135070.

Patent Abstract of Japan, vol. 012, No. 300 (P–745), Aug. 1988, re JP–A 63–073371.

A Planning Method Combining Rule–Bases and Optimization Algorithms for Transportation Network, Institute of Electrical and Electronics Engineers, Nov. 9, 1992, pp. 902–906.

An Optimal Algorithm for Sales Reprsentative Time Management, Management Science, Dec. 1979, pp. 1197–1207.

Entertainment Guide Enabling, IBM Technical Disclosure Bulletin, Apr. 1, 1994, p. 567.

Abstract, System for providing recommended routes in sightseeing spots by using fuzzy theory. Masami Kato et al. Information Processing Society of Japan. pp. 1572–573, no date.

Abstract, Basic Examination on System for Planning tourism Program, Masami Kato et al, Information Processing society of Japan, no date.

A Travel Consultation System: towards a smooth conversation in Japan, H. Suzuki et al, Abstract, pp. 227–235, no date.

Dialog (R) File 613: PR Newswire (c) 1998 PR Newswire Association Inc. p. 1–2.

Primary Examiner—Emanuel Todd Voeltz
Assistant Examiner—Thomas A. Dixon
Attorney, Agent, or Firm—Pillsbury Madison & Sutro LLP

[57] ABSTRACT

An itinerary preparing system capable of easily preparing a complete travel plan that efficiently incorporates desired visiting places. A user inputs from a terminal an intended travel time of a trip together with visiting place information. Based on the visiting place information, a calculating section for calculating an expected consumption time in an information center calculates an expected consumption time for transportation to reach a visiting place or an expected length of stay thereat. An excess/shortage determining section compares the intended travel time with the total expected consumption time of the trip, and adjusts the intended travel time or the total consumption time based on the comparison result. Consequently, an itinerary preparing section makes a travel plan and transmits it to the terminal via an I/O section. When the received itinerary is approved at the terminal, the information center revises the itinerary by filling in free time of the itinerary. When the revised itinerary is sent back to the terminal and approved, a final itinerary is provided.

10 Claims, 8 Drawing Sheets

U.S. PATENT DOCUMENTS

| | | | |
|---|---|---|---|
| 5,006,985 | 4/1991 | Ehret et al. | 705/9 |
| 5,031,104 | 7/1991 | Ikeda et al. | 701/209 |
| 5,231,584 | 7/1993 | Nimura et al. | 701/202 |
| 5,237,499 | 8/1993 | Garback | 705/5 |
| 5,272,638 | 12/1993 | Martin et al. | 455/456 |
| 5,331,546 | 7/1994 | Webber et al. | 705/6 |
| 5,353,034 | 10/1994 | Sato et al. | 342/457 |
| 5,377,113 | 12/1994 | Shibazaki et al. | 701/209 |
| 5,467,268 | 11/1995 | Sisley et al. | 705/9 |
| 5,559,707 | 9/1996 | Delorme et al. | 701/200 |
| 5,568,390 | 10/1996 | Hirota et al. | 701/201 |
| 5,623,404 | 4/1997 | Collins et al. | 705/9 |
| 5,924,075 | 7/1999 | Kanemitsu | 705/6 |

| TIME | CONTENTS | PLACE |
|---|---|---|
| 9:00 ⋮ 15:00 | DEPARTURE | MISYUKU, SUSONO-SHI |
| 15:00 ~ 17:30 | WATCH SOCCER MATCH TEAM A VS. TEAM B | NATIONAL STADIUM |
| 18:00 ~ 19:00 | DINNER RESTAURANT C | YOTSUYA |
| 22:00 | RETURN | MISYUKU, SUSONO-SHI |

Fig. 4

| TIME | CONTENTS | PLACE |
|---|---|---|
| 9:00 | DEPARTURE | MISYUKU, SUSONO-SHI |
| | FREE 1 | |
| 15:00 ⁠〜 17:30 | WATCH SOCCER MATCH TEAM A VS. TEAM B | NATIONAL STADIUM |
| | FREE 2 | |
| 18:00 ⁠〜 19:00 | DINNER RESTAURANT C | YOTSUYA |
| | FREE 3 | |
| 22:00 | RETURN | MISYUKU, SUSONO-SHI |

Fig. 5

[SHOPPING AT SHIBUYA PLAN]

Fig.6A

| TIME | CONTENTS | PLACE |
|---|---|---|
| 9:00 | DEPARTURE | MISYUKU, SUSONO-SHI |
| 11:00 – 14:30 | MEAL & SHOPPING | SHIBUYA |
| 15:00 | WATCH SOCCER MATCH | NATIONAL STADIUM |

[LATE DEPARTURE PLAN]

Fig.6B

| TIME | CONTENTS | PLACE |
|---|---|---|
| ☆12:30 | DEPARTURE | MISYUKU, SUSONO-SHI |
| 15:00 | WATCH SOCCER MATCH | NATIONAL STADIUM |

[DRIVE ORDINARY ROAD PLAN]

Fig.6C

| TIME | CONTENTS | PLACE |
|---|---|---|
| 9:00 | DEPARTURE | MISYUKU, SUSONO-SHI |
|  |  | ↓ ROUTE ** |
| 10:00 | (HAKONE) | HAKONE |
|  |  | ↓ ROUTE ** |
| 11:00 | (ODAWARA) | ODAWARA |
|  |  | ↓ ROUTE ** |
| 13:00 | (KAMAKURA) | KAMAKURA |
| 15:00 | WATCH SOCCER MATCH | NATIONAL STADIUM |

| TIME | CONTENTS | PLACE |
|---|---|---|
| 9:00 | DEPARTURE | MISYUKU, SUSONO-SHI |
| ⁽ ⁾ | TRANSPORTATION | TOMEI FREEWAY & METRO-FREEWAY |
| 11:00 | | |
| ⁽ ⁾ | MEAL & SHOPPING | SHIBUYA |
| 14:30 | | |
| ⁽ ⁾ | TRANSPORTATION | ROUTE ** |
| 15:00 | | |
| ⁽ ⁾ | WATCH SOCCER MATCH TEAM A VS. TEAM B | NATIONAL STADIUM |
| 17:30 | | |
| ⁽ ⁾ | TRANSPORTATION | ROUTE ** |
| 18:00 | | |
| ⁽ ⁾ | DINNER RESTAURANT C | YOTSUYA |
| 19:00 | | |
| ⁽ ⁾ | TEA BREAK CAFE D | YOTSUYA |
| 20:00 | | |
| ⁽ ⁾ | TRANSPORTATION | TOMEI FREEWAY & METRO-FREEWAY |
| 22:00 | RETURN | MISYUKU, SUSONO-SHI |

SYSTEM FOR PLANNING AND REVISING AN ITINERARY BASED ON INTENDED TRAVEL TIME AND EXPECTED CONSUMPTION TIME

BACKGROUND OF THE INVENTION

1. Field of the Invention

The present invention relates generally to itinerary preparing systems, and more particularly to an itinerary preparing system capable of preparing a complete travel plan that efficiently incorporates desired visiting places.

2. Description of the Related Art

Recently, a communication system has been proposed which performs data communication between an information control center and a terminal, such as an on-vehicle terminal installed on a vehicle or a portable terminal which a user can carry anywhere, so as to provide information of an optimum transportation route. Similarly, a communication system capable of providing various services including reservations for amusement facilities or restaurants has been proposed as well. These communication systems can effectively provide the user-required information if the system is combined with a navigation system. The navigation system indicates current and destination positions on a self-contained map, wherein the current position is recognized by a current position detecting sensor, such as a GPS (Global Positioning System) or a direction sensor. Based on the position information, the navigation system provides a recommended transportation route. By using this system, one can travel through an optimum route, while getting various services. Moreover, if desired destinations, date, and time are input to the system in advance, an appropriate itinerary (or transport schedule) can be prepared before departure, thus enhancing enjoyment of a motoring excursion.

Another navigation system which has been proposed so far includes an apparatus capable of searching possible facilities which one can reach within a limited time, and providing the acquired information to the user. For instance, Japanese Patent Laid-Open Publication No. Hei 7-55484 discloses a navigation system which utilizes map data or traffic condition data to suggest how far one can reach or which route is suitable within a prescribed time period entered by the user, or indicates a possible area range based on the remaining fuel amount. According to this navigation system, the reachable area range can be easily known, so that the user can prepare a more detailed itinerary based on the acquired information.

However, the information collected by the aforementioned navigation system is limited to information such as the departure and return time, or reservations for and possibilities of reaching the visiting places (including intermediate locations and destinations). As such, it is difficult to know the timewise relationship between individual pieces of information in the itinerary, and it is difficult for a user to understand an entire overview of an itinerary. For instance, if an itinerary includes only one visiting place and the system assures the possibility of reaching the place, a situation may arise where one cannot complete the trip within the user-intended total time due to a traveler's overstay at the visiting place. In other cases, where the itinerary includes a plurality of visiting places together with time restrictions such as a specific arrival time or length of stay at each visiting place, and therefore the flexibility of the itinerary is decreased, it may not be possible to incorporate all visiting places within the user-intended total time of the trip, or it is likely that the same time slot may be specified as the arrival time at multiple places. Consequently, the itinerary becomes imperfect. When this occurs, the itinerary needs to be revised. However, a problem is that one cannot easily determine what part of the itinerary should be revised. As such, itinerary preparation becomes complicated.

Worse, it is likely that adjustment of the itinerary is incorrect and the visiting place where one wants to visit most may be adjusted inappropriately or inadvertently deleted. As a result, preparation of the itinerary becomes even further complicated and time-consuming.

SUMMARY OF THE INVENTION

The present invention is made to solve the above problems, and aims to provide an itinerary preparing system capable of preparing a complete travel plan which efficiently incorporates desired visiting places.

In order to achieve the above object, the present invention provides in one aspect an itinerary preparing system for preparing a travel plan based on input information, comprising:

an input means for entering travel plan information which includes an intended travel time taken from start to end of a trip;

an acquiring means for obtaining an expected consumption time of the trip in accordance with the travel plan information;

an excess/shortage determining means for comparing the intended travel time with the expected consumption time of the trip to determine an excess or shortage of the expected consumption time relative to the intended travel time; and a plan changing means for revising the itinerary, when the excess/shortage determining means finds an excess or shortage, by changing at least one of the intended travel time and the expected consumption time so that the excess or shortage can be offset.

Note that the travel plan information refers to such information as time and position information, and other associated information required for preparing the itinerary. Also note that the intended travel time from start to end of the trip represents a certain time period in the itinerary. For example, if the trip starts from and ends at home, the intended travel time equals time taken after starting from home till returning back home. In a case where the trip starts at home and ends at a given place or vice versa, the intended travel time equals time taken to travel between home and the given place. That is, the intended travel time represents the total time to complete the trip, while the expected consumption time of the trip represents time estimated to be consumed by transportation, staying at visiting places, and so on.

In this configuration, if any excess or shortage is found in the expected consumption time relative to the intended travel time, the system attempts to offset the excess/shortage by changing at least one of these before preparing the itinerary.

In this way, a traveler can easily obtain a complete itinerary which incorporates desired visiting places efficiently, while understanding the entire overview of the itinerary.

In another aspect of the present invention, the travel plan information includes visiting place information consisting of the number of places to visit and length of stay at each place. Accordingly, the plan changing means prepares an itinerary by changing at least one of the number of visiting places or the length of stay at respective visiting places.

Note that the visiting places refer to certain points in the travel plan, such as the destination and the return place of the trip, the intermediate places of the trip, and so on. That is, the visiting places can be represented by specific locations, place names, or facility names, or can be represented by types of purpose for using the facilities, details of services, and so on.

In this configuration, it is possible to prepare a complete itinerary which utilizes the intended travel time effectively by changing at least one of the number of visiting places or the length of stay at those visiting places. Note that if the itinerary includes only one visiting place, so that the visiting place represents the destination, then the system changes only the length of stay at that place.

In still another aspect of the present invention, the visiting place information includes a plurality of visiting places and the length of stay at those visiting places. The system further comprises a priority setting means for giving priority to each visiting place. Accordingly, if the excess/shortage determining means finds an excess, the plan changing means attempts to prepare an itinerary by at least either reducing the length of stay at the visiting places having low priority, or deleting such visiting places from the itinerary.

By giving priority to every visiting place, this configuration prevents inadvertent deletion of visiting places saving high priority (or significance) from the itinerary or decreases in the lengths of stay at such visiting places. Thus, the system can prepare an itinerary which ensures visits to the most desired places within the intended travel time.

In a further aspect of the present invention, the plan changing means includes a supplementary schedule presenting means for presenting a supplementary schedule which offsets a shortage of the expected consumption time relative to the intended travel time, when the excess/shortage determining means finds the shortage.

Note that the supplementary schedule refers to a schedule which suggests some routes covering scenic or historic sites located somewhere between the start and end points of the trip or near the desired visiting places, a recommended driving route associated with the desired visiting places, etc.

This configuration enables effective use of the intended travel time by making up the shortage of the expected consumption time relative to the intended travel time.

In a still further aspect of the present invention, the travel plan information includes the start and end time of the trip, whereby the plan changing means prepares an itinerary by changing at least one of the start and end time of the trip.

In this configuration, if the estimated time consumed to reach the desired visiting place exceeds the intended travel time, the intended travel time can be adjusted so that it meets the expected consumption time of the desired travel plan by changing at least one of the start and end time of the trip. Thus, the desired travel plan can be easily provided.

In a still further aspect of the present invention, the system comprises an output device for outputting a prepared itinerary.

Note that the output device may be a display device or a printer. This configuration improves understanding of the entire overview of the itinerary.

In a still further aspect of the invention, the visiting place information includes facility type information in which various visiting places are sorted by facility type. The system further comprises a searching means for searching the visiting places based on facility types to retrieve certain facilities. After preparing an itinerary using the facility types, the system can provide details of a selected visiting place that matches a certain facility type.

Note that the facility type refers to a category of visiting places which represents a feature of the places. For example, there are general categories like "meal", "shopping", etc., and specific categories like "Japanese food dinner", "shop for shoes", and so on.

In this configuration, the entire overview of the itinerary can be understood easily, as the itinerary is represented concisely by facility type. Also, the details of the itinerary can be understood easily, as detailed information of the visiting places are given in the itinerary.

In a still further aspect of the invention, the output device displays individual items of the itinerary by putting a mark on revised items.

The mark is used to distinguish revised items from unrevised items of the itinerary, for example, by changing a displaying color, putting a star mark, or putting the item in a bracket. This configuration can improve understanding of the revised contents or the entire image of the itinerary.

Further, to achieve the above object, in accordance with another embodiment, there is provided a program storage device readable by a machine, tangibly embodying a program of instructions executable by the machine to perform method steps for making an itinerary, the method steps comprising steps of:

1) receiving travel plan information which includes an intended travel time taken from start to end of a trip;
2) obtaining an expected duration of the trip in accordance with the travel plan information;
3) comparing the intended travel time with the expected duration of the trip to determine an excess or shortage of the expected duration relative to the intended travel time; and
4) when the determining step finds an excess or shortage, changing at least one of the intended travel time and the expected duration so that the excess or shortage can be offset.

The program storage device includes, for example, a magnetic disc, magnetic tape, RAM, flash memory, optical disc, DVD, and so on, as well as a CD-ROM and a floppy disc. The storage device also includes a RAM which stores the program received from an outside service center via a communication line and is used to perform an itinerary preparing operation.

According to the above configuration, the program stored in the storage device can be executed by a personal computer or the like. Thus, it is possible to easily prepare a complete itinerary which incorporates desired visiting places efficiently, by using existing hardware.

DESCRIPTION OF THE PREFERRED EMBODIMENT

Preferred embodiments of the present invention will be described below with reference to the attached drawings.

Figure 1:
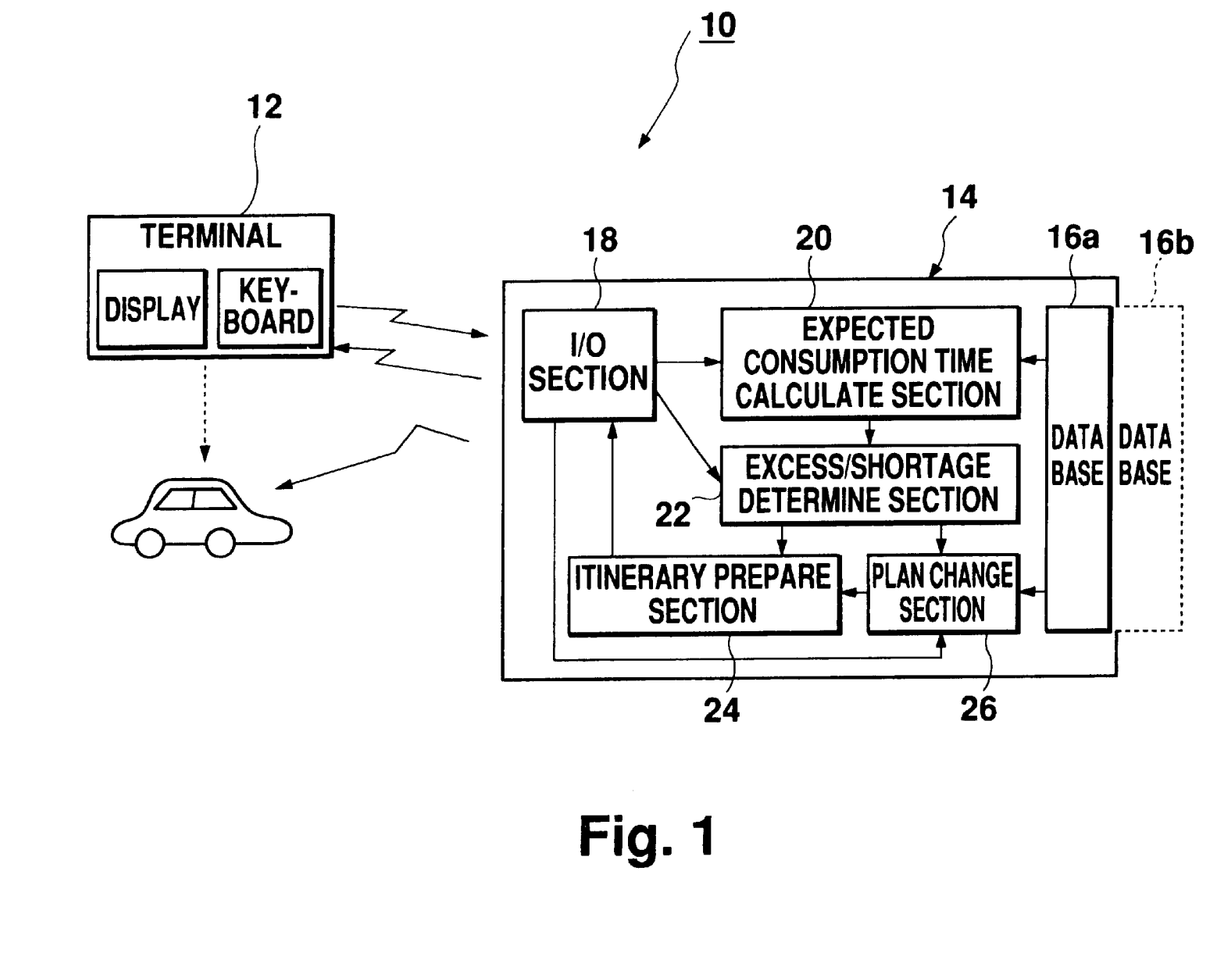
FIG. 1 is a block diagram illustrating a configuration of an itinerary preparing system according to the present invention.

FIG. 1 shows a block diagram of an itinerary preparing system 10 according to the present invention. In this embodiment, the itinerary preparing system 10 comprises a terminal 12, such as a personal computer terminal, which is manipulated directly by a traveler (or a user) who attempts to prepare the itinerary, and an information center 14 capable of transmitting and receiving data to and from the terminal 12 by, e.g., a communication means. When the user attempts to prepare an itinerary by using the itinerary preparing system 10, the user enters necessary information, such as desired start time (departure time) and end time (return time) of a trip, desired places to visit (including destinations, return place, and intermediate places), etc. Upon receiving the information, the information center 14 starts preparing an itinerary in order to provide a complete itinerary. The user enters the information using a keyboard or a mouse, while watching the prepared itinerary on a display screen to confirm the contents thereof. The display can be replaced with a touch panel having input functions.

The information center 14 can utilize a self-contained database 16a, as well as a database 16b of an external information source (i.e., police or other service facilities).

The databases 16a, 16b store information like local map information, traffic information about traffic conditions and road regulations sorted in detail by location, time slot, or the like. The databases 16a, 16b further include such information as locations of, and contents of services available at various service facilities, e.g., stadium, theater, department store, and so on.

The information center 14 consists of: an I/O section 18 which transmits and receives data to and from the terminal 12; a calculating section 20 which calculates an expected consumption time of a trip based on the information entered via the I/O section 18; an excess/shortage determining section 22 which determines whether the user can visit desired places between the entered start time and return time; an itinerary preparing section 24 which actually makes a travel plan; and a plan changing section 26 which revises the itinerary by changing the visiting places or the length of stay at those places.

Figure 2:
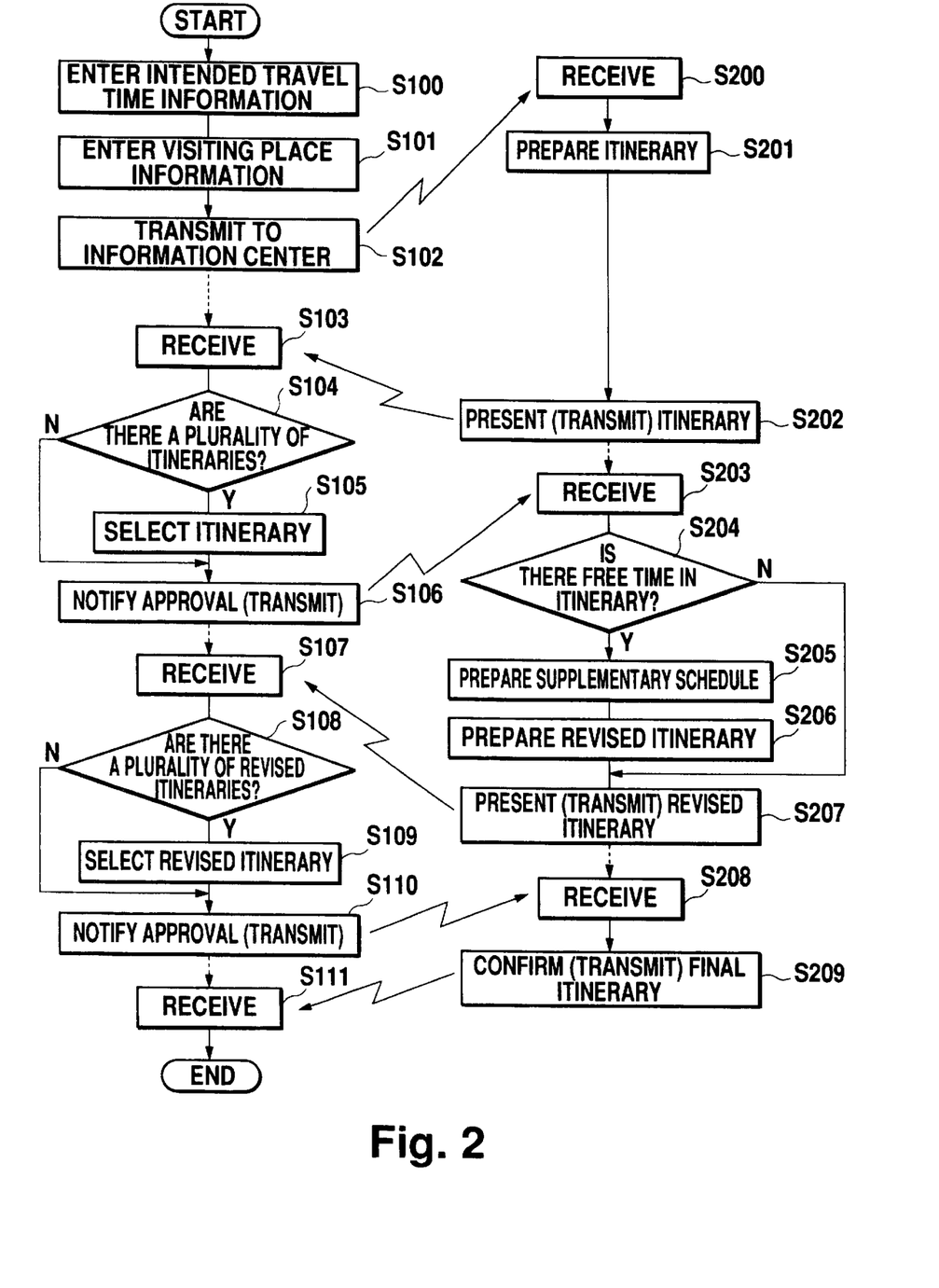
FIG. 2 is a flowchart illustrating procedures of the itinerary preparing system according to the present invention.

In the following, operations of the itinerary preparing system 10 will be described with reference to the flowcharts of FIGS. 2 and 3, and the display examples of FIGS. 4 to 7. Note that the left half of the flowchart of FIG. 2 represents processing carried out by the terminal 12, while the right half thereof represents processing by the information center 14.

Using the terminal 12, the user enters a basic image of an itinerary (S100). At first, the user enters information of a desired travel plan in terms of start and return locations of the trip. Preferably, these locations are specified with addresses or names of facilities so that the locations can be pinpointed on a map. Corresponding to the start and return locations, the user enters other travel plan information in terms of start and return time of the trip, thereby specifying a desired total time of the trip. Note that in the travel plan information regarding time, the start time refers to departure time from a given location. Namely, the start time equals departure time from home if the itinerary should start from home, while the start time equals departure time from a certain facility if the itinerary should start from the certain facility. Similarly, the return time refers to arrival time at a given location where the trip terminates. Namely, the return time equals arrival time at home if the itinerary should end at home, while the return time equals the time that a stop at a certain facility should be completed if the itinerary should end with arrival at and completion of stay at the certain facility. In this embodiment, it is assumed that the user tries to prepare an itinerary of a loop trip starting from home (located in Misyuku, Susono-shi) at 9:00 and returning back home at 22:00.

Next, the user enters information regarding desired places to visit (including intermediate places and destinations) during the trip (S101). The entered information should be inherent to individual visiting places, for example: a specific name of a facility; a facility type representing features of the facility such as contents of services available at the facility and a facility name by which the facility is commonly known; arrival time at the place and an intended length of stay thereat; the estimated time of passing a certain location on the way to the visiting place; etc.

Specifically, the user may enter "watch soccer match", "amusement park", "movie", "dinner", "shopping", etc. as the visiting place information. If the user wants to specify the places more in detail, details of the places are entered as well. For example, in the case of "watch soccer match", the user may enter "participants of the game (e.g., team A vs. team B)", or "National Stadium" as the place where the game is held. In the case of "amusement park", a specific place like "XX-land" or a length of stay like "10:00–17:00" may be entered as well. Note that the above entries of "watch soccer match", "amusement park", "movie", "dinner", "shopping", etc. are the facility types representing the contents of services and the like. Upon receipt of the facility type information, the information center 14 searches the databases 16a, 16b (See FIG. 1) to retrieve several candidate places and the length of stay which fits the facility type requirements. This is done by taking into consideration the departure and arrival time for each facility type, and the candidate places relative to other facility types or places. For example, in the case of the entry of "watch soccer match", search is conducted with respect to what kind of games are to be held, where the games are held, and when the kick-off time is, etc. on the day of the trip. In the case of the entry of "movie", if a title of the movie has been specified, then places to show the movie, start time of the movie, show time of the movie, and so on are searched.

Alternatively, a priority setting means can be provided for setting priority to each visiting place simultaneously with entering the visiting place information. Priority may be given in the order of entry of the places, or numeric numbers indicating priority may be given separately to respective visiting places. The priority is useful in revising the itinerary, which will be explained later.

When the user completes entering the image of the intended trip, the input data are transmitted to the information center 14 (S102). When the information center 14 receives via the I/O section 18 the intended time information and the visiting place information (S200), it starts preparing an itinerary based on the received information (S201).

Figure 3:
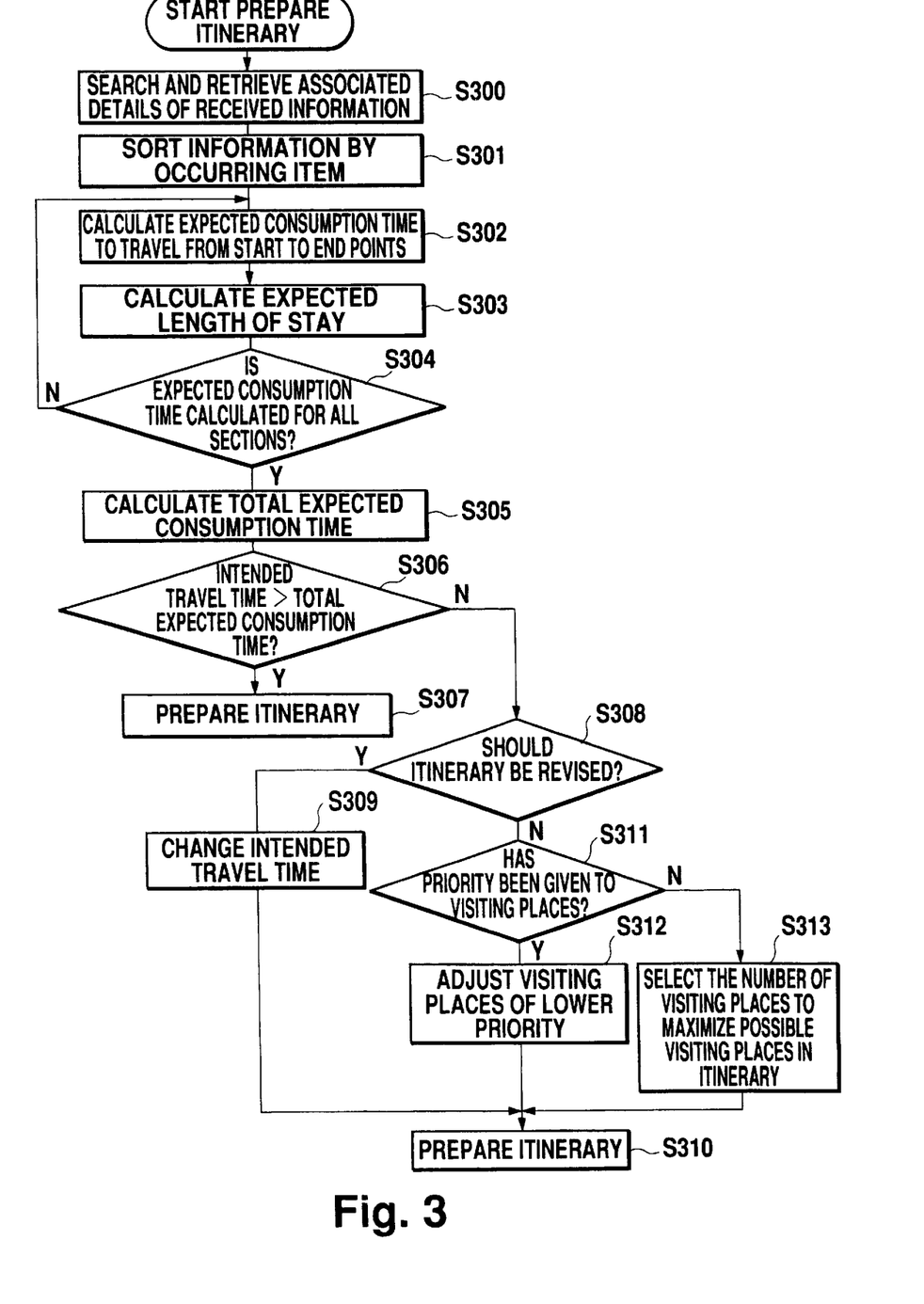
FIG. 3 is a flowchart illustrating in detail procedures of the itinerary preparing system according to the present invention.

FIG. 3 is a flowchart illustrating procedures of preparing the itinerary. Assume that the information center 14 receives the intended travel time information of "depart from home (Misyuku, Susono-shi) at 9:00" and "return home (Misyuku, Susono-shi) at 22:00", while receiving the visiting place information of "watch soccer match, team A vs. team B", and "dinner at restaurant C in Yotsuya from 18:00 to 19:00". In this case, the calculating section 20 for calculating the expected consumption time searches the databases 16a, 16b to retrieve the necessary information (S300). Specifically, a place where the game is to be held (e.g., National Stadium) and game hours (e.g., 15:00–17:00) can be retrieved corresponding to the entry of "watch soccer, team A vs. team B." Similarly, a location of restaurant C can be identified corresponding to the entry of "dinner at restaurant C in Yotsuya from 18:00 to 19:00." Search will continue until a recommended route to reach individual places is obtained.

Occurrence of items in the itinerary are sorted by the calculating section 20 for calculating the expected consumption time of the trip based on the received information, with the visiting places being used as flags (S301). Namely, the itinerary from beginning to end of the trip will be divided into sections, each section representing a visiting place or a distance from one place to another. In this embodiment, the itinerary is divided into five sections: section 1 represents a distance from home to the soccer stadium; section 2 represents watching a soccer match; section 3 represents a distance from the soccer stadium to the restaurant; section 4 represents having a dinner at the restaurant; and section 5 represents a distance from the restaurant to home. As far as the sections 1, 3, and 5 are concerned, an expected consumption time to travel a recommended route from start to end points of each section will be calculated in accordance with the travel distance, the road traffic condition, etc., which are available from the databases 16a, 16b (S302). As for sections 2 and 4, an estimated length of stay at individual places will be calculated by taking into consideration the time required for the game or dinner (S303). If the user does not input the estimated length of stay at each visiting place, it is still possible to calculate it from the known game hours, as in the soccer match, or from the past trend which teaches how much time is necessary to fully enjoy sightseeing or playing at the visiting places.

After that, it is determined whether the expected consumption time is calculated for all sections (S304), and if affirmative, each expected time is summed up to provide a total expected consumption time (S305).

Figure 4:
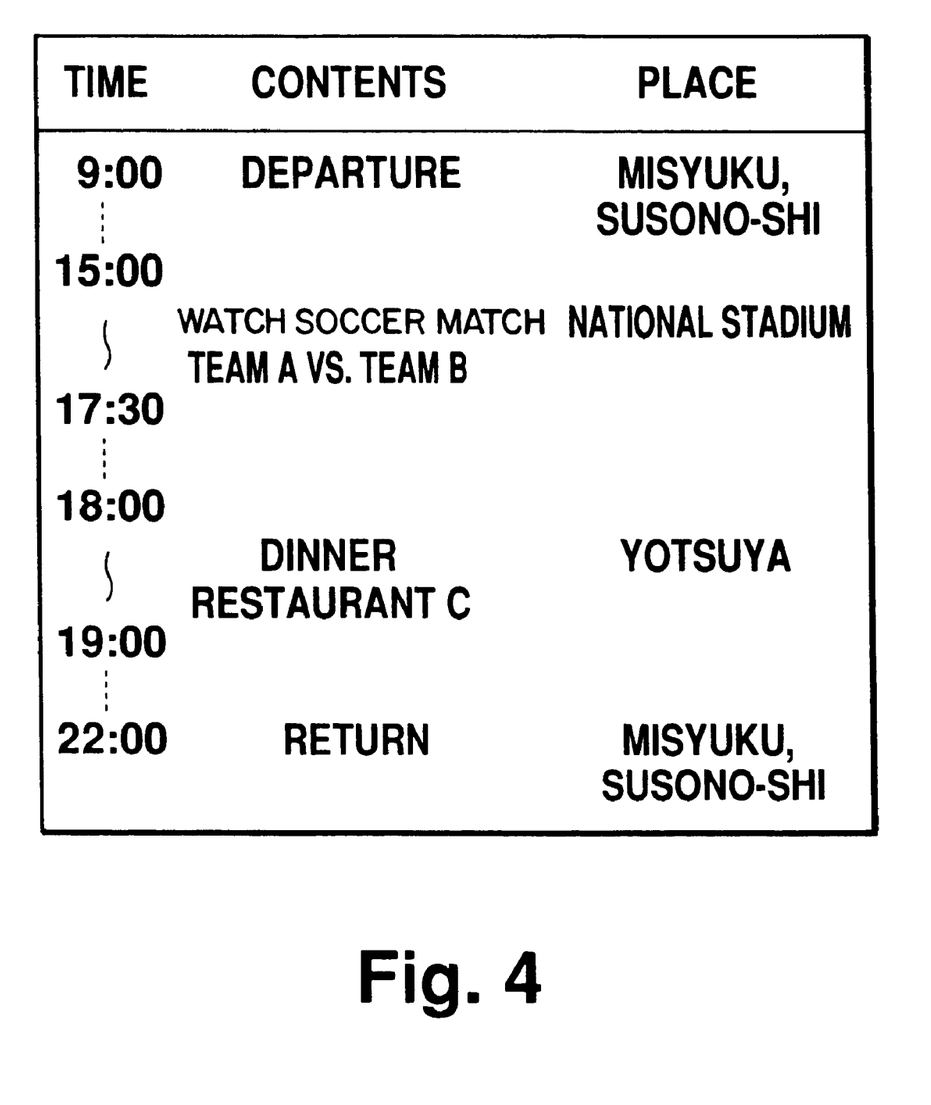
FIG. 4 is a display example of an itinerary prepared by the itinerary preparing system according to the present invention, wherein desired visiting places are incorporated within an intended travel time.
Figure 5:
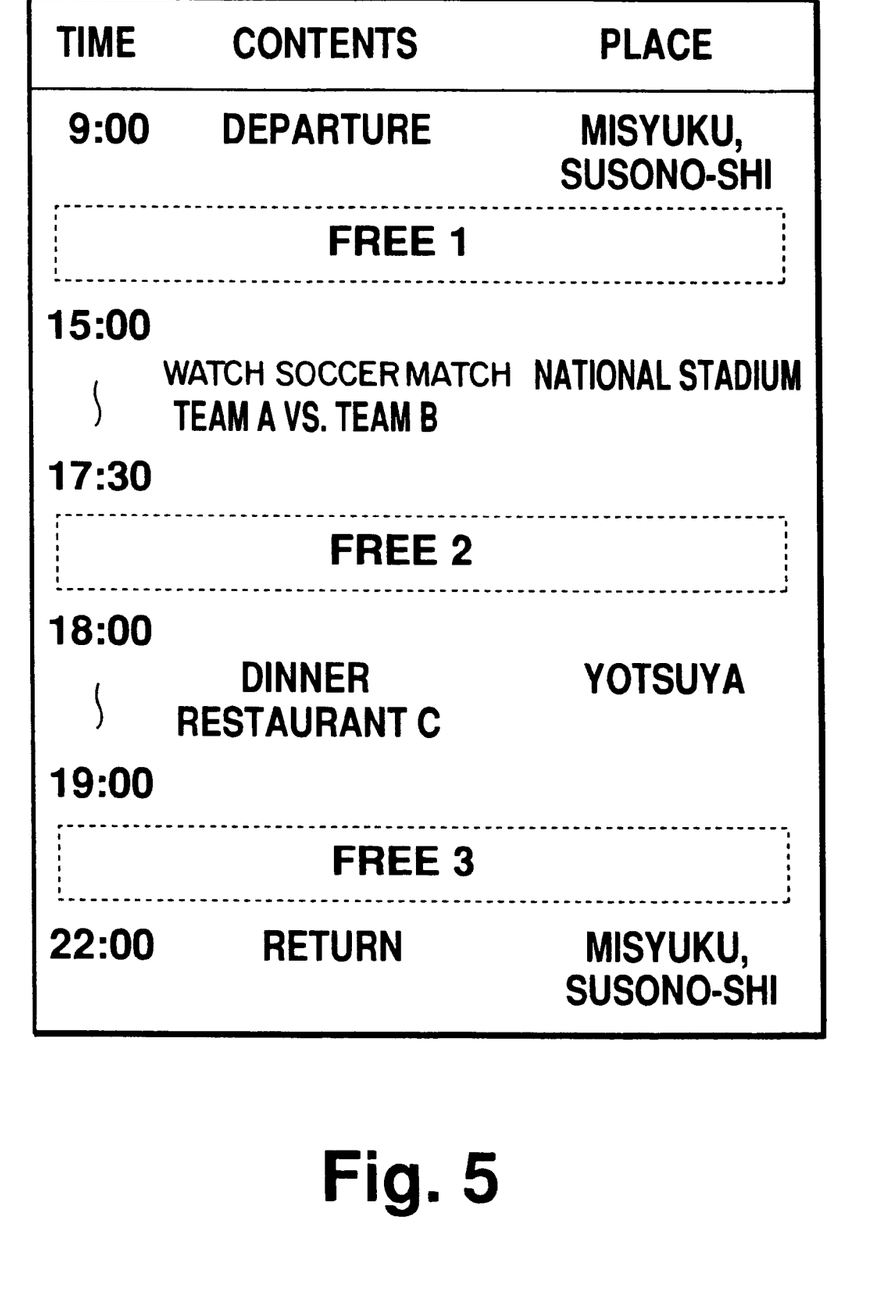
FIG. 5 is a display example of an itinerary prepared by the itinerary preparing system according to the present invention, which indicates free time in the itinerary.

The total expected consumption time is compared with the above intended travel time in the excess/shortage determining section 22 (S306). If it is found that the intended travel time is greater than the total expected consumption time, a traveler can visit the desired places and fully enjoy sightseeing, recreating, etc. at those places within the intended time period. Thus, the itinerary preparing section 24 proceeds to prepare the itinerary which assigns desired visiting places to respective scheduled time as shown in FIG. 4 (S307).

On the other hand, if there are too many desired visiting places, or if it takes too much time to transport to or visit the respective places, thereby causing an intended travel time smaller than the total expected consumption time, then it is impossible to reach the desired visiting places within the intended time period. In this case, the plan changing section 26 changes the intended travel time or the expected consumption time so as to offset the excess.

This is done by first determining whether the intended travel time has to be altered (S308). Alteration of the intended travel time is carried out by changing at least one of the start time and the end time of the trip by a unit time (e.g., 15 minutes) (S309), before preparing the itinerary (S310). In this way, it is possible to make a complete travel plan which incorporates all of the desired visiting places by way of, e.g., advancing the start time by 1 hour, delaying the finish time by 2 hours, or the like.

In the case where alteration of the intended travel time is not conducted, the visiting place information will be revised to provide the complete itinerary which incorporates the desired visiting places within the intended time. First, it is determined whether priority has been given to respective pieces of the visiting place information (S311). If priority has been given, the itinerary will be adjusted by reducing the length of stay at visiting places in order starting from the place having the lowest priority, or by deleting such visiting places from the itinerary (S312). For example, assuming that four visiting places have been entered in the itinerary, the length of stay at the place of priority No. 4 may be halved, or the length of stay at the place of priority No. 3 may be reduced to ⅓. Note that a reduction ratio can be set arbitrarily. As for the deletion of visiting places, the place of priority No. 4. will be deleted first in the above example. This is preferable because the deletion of the place of priority No. 4 accompanies deletion of time to reach that place as well, thereby making the adjustment of the expected consumption time more efficient. In accordance with the adjustment, an itinerary is prepared (S310).

If it is determined in S311 that priority has not been given to the visiting places, selection will be conducted so that the maximum number of places can be included in the itinerary within the intended time period (S313). For example, the visiting places may be selected in the order of shortness of the stay time, or the visiting places having close proximity to each other so that it will not require much transportation time may be selected. In accordance with the selection result, an itinerary is prepared (S310).

It is understood from the above that only one itinerary is prepared when it is determined in S306 that the intended travel time of the trip is greater than the total expected consumption time of the trip. On the other hand, a plurality of itineraries are provided in the reverse case, which include revised plans wherein the intended travel time or the expected consumption time has been altered.

Returning to the flowchart of FIG. 2, when an itinerary is prepared at the information center 14, the itinerary is presented (or transmitted) to the terminal 12 (S202). Note that the presented itinerary is not a final one, so that it is provided only on a display screen, for example. Upon receipt of the itinerary from the information center 14 (S103), it is determined whether there are a plurality of itineraries provided (S104). If so, the user selects a desired itinerary among the displayed itineraries (S105). When a single itinerary is decided through S104 and S105, an approval notice by the user will be sent to the information center 14 (S106).

Figure 6A:
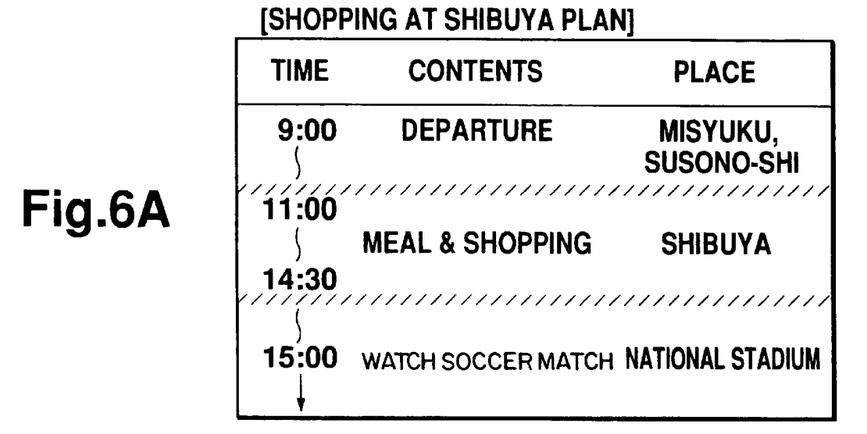
FIGS. 6A, 6B, and 6C are examples of a supplementary schedule used in the itinerary preparing system according to the present invention.
Figure 6B:
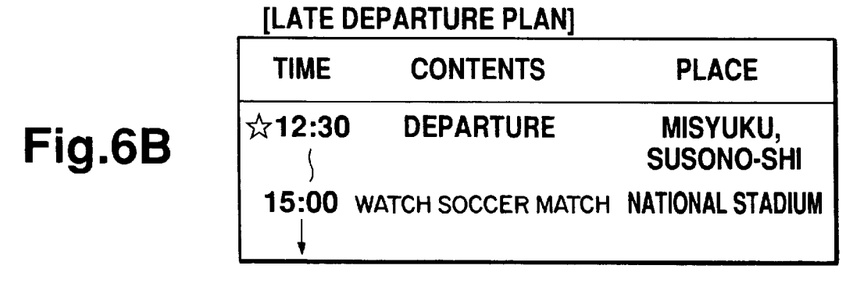
Figure 6C:
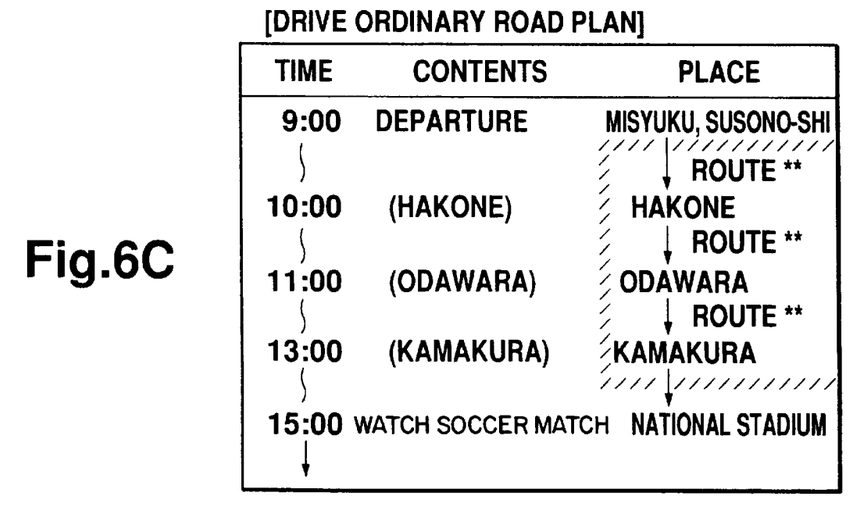

When the information center 14 receives the approval notice (S203), it is determined if the approved itinerary includes any free time (S204). It is likely that the itinerary given at this point includes free time, such as Free 1, Free 2, and Free 3 shown in FIG. 5, regardless of whether adjustment of the intended travel time of the trip or the visiting places has been carried out. When free time is found in the itinerary, the information center 14 provides a supplementary schedule for filling in the free time so that the itinerary is full (S205). FIGS. 6A, 6B, and 6C illustrate examples of such a supplementary schedule. FIG. 6A is an example of the supplementary schedule for Free 1, wherein the free time before beginning of the soccer match at 15:00 is eliminated by adding a meal and shopping at Shibuya. Similarly, Free 2 and Free 3 can be eliminated by the supplementary schedule which suggests recommended places to visit feasible within the free time, taking into consideration the transportation time and the length of stay.

FIG. 6B is an example of eliminating Free 1 by delaying the start time (or departure time) of the trip. Similarly, Free 3 can be eliminated by advancing the end time (or return time) of the trip. FIG. 6C is an example of eliminating Free 1 of FIG. 5 by selecting an ordinary road for a driving route.

Figure 7:
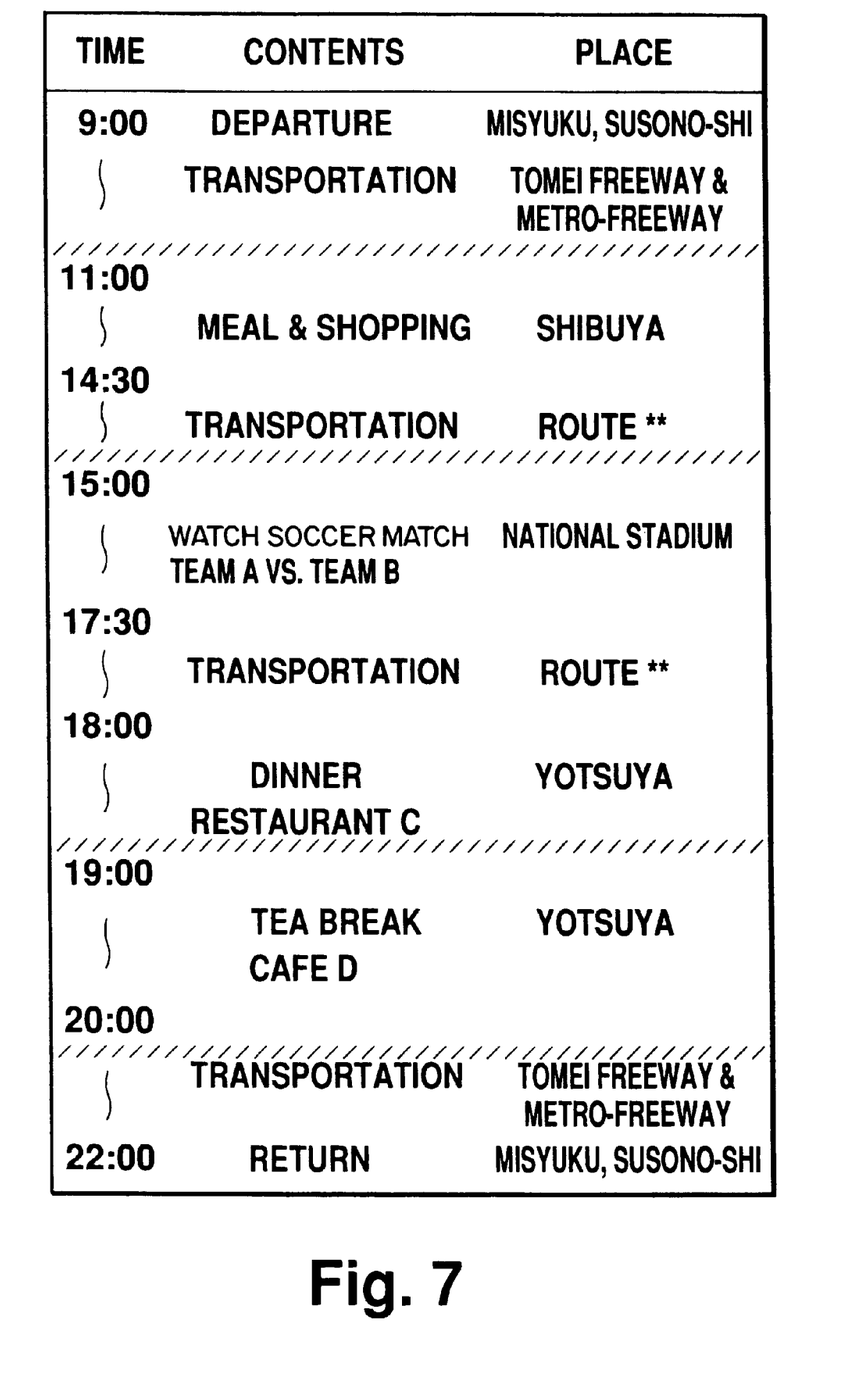
FIG. 7 is a display example of a final itinerary confirmed in the itinerary preparing system according to the present invention.

The information center 14 adds the supplementary schedule to the received itinerary approved by the user (S203) to prepare a revised itinerary (S206), and presents (or sends) it to the terminal 12 (S207). FIG. 7 illustrates an example of the itinerary revised by using the supplementary schedule as shown in FIG. 6A. At this time, the terminal 12 receives a plurality of other itineraries revised by using the supplementary schedule shown in FIGS. 6B and 6C.

When the terminal 12 receives the revised itinerary (S107), it is determined whether there are a plurality of revised itineraries (S108). If so, the user selects a desired itinerary from the plurality of revised itineraries shown on the display screen (S109). Consequently, when a single revised itinerary is determined through S108 and S109, a user's approval notice is sent to the information center 14 (S110).

Upon receipt of the user's approval notice of the revised itinerary (S208), the information center 14 confirms the itinerary as a final itinerary and transfers it to the user (S209). If necessary, additional information such as detailed route guidance useful for implementing the itinerary can be transmitted as well.

If the confirmed final itinerary is transmitted to the terminal 12 (S111), it displays the itinerary on the display screen or outputs the itinerary from, e.g., a printer. Then, the itinerary will be transferred together with the associated data to a navigation device installed on a vehicle. The itinerary preparation is thus completed. Note that the final itinerary can be transmitted directly to the navigation device of the vehicle from information center 14.

From the above, it should be understood that an itinerary which incorporates the user's desired visiting places can be prepared. At the same time, the entire overview of the itinerary can be easily understood.

It is described herein that the revised itinerary containing the supplementary schedule is transferred in S205–S207, but it is also possible to send the itinerary indicating free time (e.g., Free 1–Free 3 of FIG. 5) to the terminal 12 together with the supplementary schedule shown in FIGS. 6A–6C, such that the user can insert a desired supplementary schedule to respective free time slots. It is also possible for the user to construct a revised itinerary by obtaining each supplementary schedule from the information center in response to the free time situations of the itinerary. By preparing the itinerary in this way, the limit of contents capable of being incorporated into the itinerary can be easily known, thereby improving understanding of the itinerary contents.

It is described herein that the itinerary is presented to the user with specific visiting places being clearly indicated, as shown in FIG. 7, but the visiting places may also be represented by facility type, such as "movie", "dinner", "shopping", and so on, and detailed information corresponding to each facility type can be separately displayed. In this way, the itinerary can be concisely represented, thereby improving the understanding of the entire image of the itinerary. In addition, one can know the specific details of the itinerary from the displayed detailed information about the visiting places (e.g., specific names, services available, advertisement, etc. of the facilities).

It is described herein that the information center for actually preparing and revising the itinerary is provided separately from the terminal manipulated by the user. Instead, the terminal may include an itinerary preparing function so that the itinerary can be prepared by acquiring information only from an external database. Alternatively, the terminal can contain a database so that the terminal executes all the processing.

It should be understood that the terminal described herein can be implemented as a portable terminal, and that the system can be installed on a vehicle.

When displaying the itinerary in which the start time, return time, visiting places, etc. are revised, added, or deleted, certain marks are preferably put to the corresponding items so that the user can distinguish those items clearly on the display screen. For example, the revised parts can be colored differently, identified with a star mark as in FIG. 6A, or put in a bracket as in FIGS. 6B and 6C. Displayed as such, the user can easily understand the contents of the itinerary.

Although it is described herein that a plurality of visiting places are given (such as a soccer stadium and restaurant), it is possible to prepare a complete itinerary in the case of a single visiting place by similarly adjusting the length of stay or the like.

Although it is determined whether the intended travel time of the trip should be adjusted in S308 of FIG. 3, it is possible to adjust the intended travel time and the visiting places, i.e., the expected consumption time, at the same time.

Figure 8:
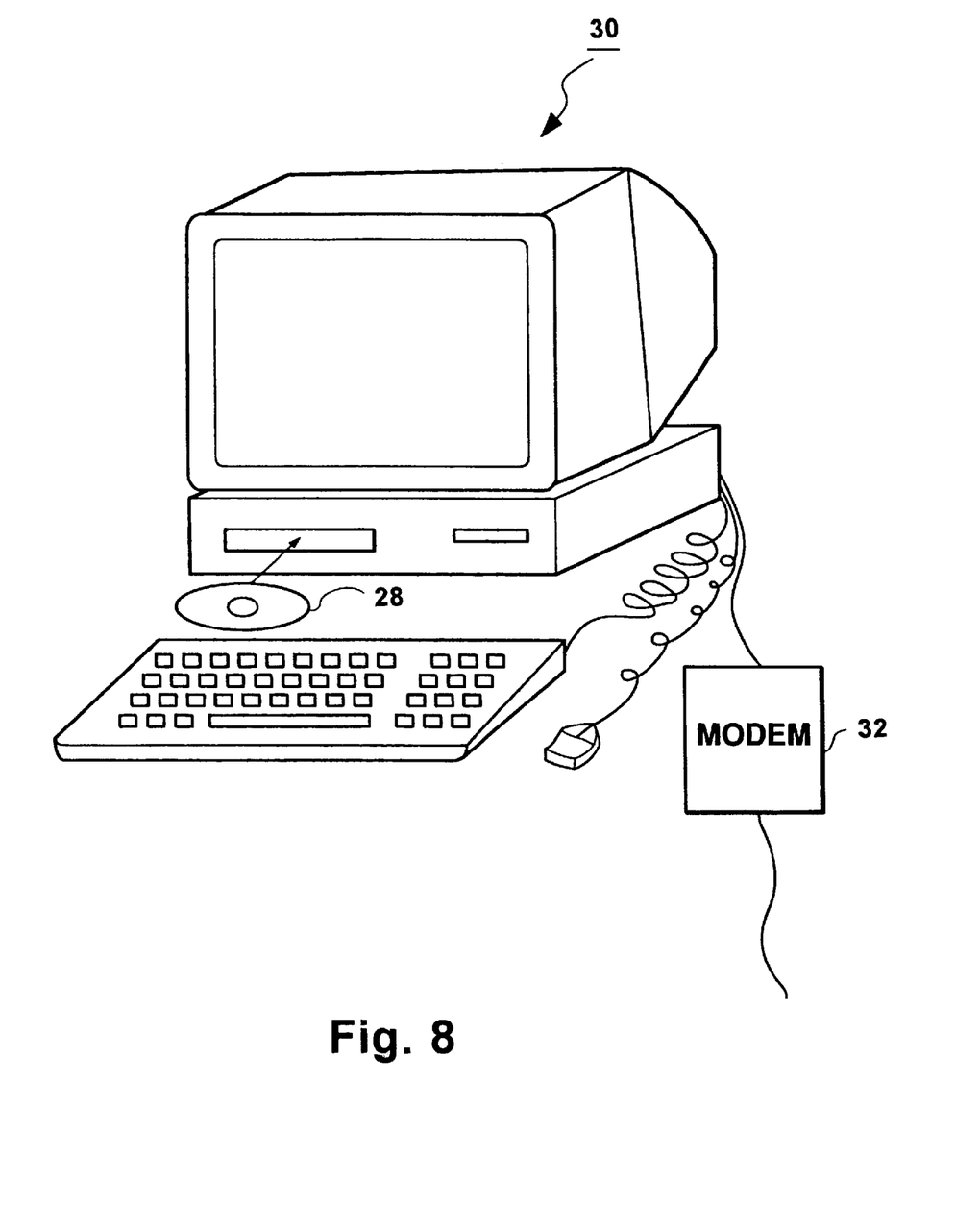
FIG. 8 is an explanatory view for showing a case where a computer is operated by using a storage device which stores a program for executing an itinerary preparing operation.

Further, the program for executing an itinerary making process (see FIGS. 2 and 3) by the itinerary making system according to the embodiments may be stored in a storage device 28 shown in FIG. 8. The program stored in the storage device is then installed into a computer 30 or the like of FIG. 8, so that the itinerary making system can be established. The storage device includes, for example, a magnetic disc, magnetic tape, RAM, flash memory, optical disc, DVD, and so on, as well as a CD-ROM, and a floppy disc. The storage device also includes an RAM which stores the program received from an outside service center via a communication line and is used to perform an itinerary preparing operation.

As shown in FIG. 8, the information can be obtained from the external database 16b shown in FIG. 1 by simply connecting the computer 30 to a modem 32. In the case where a CD-ROM which already stores information in the database 16b is used, the itinerary preparing operation may be executed without using the modem 32.

As can be seen from the above description, according to the present invention, if the expected consumption time is found shorter or longer than the intended time of the trip, at least one of them is altered as to offset the excess/shortage. In this way, the traveler (or user) can easily obtain a complete itinerary incorporating desired visiting places while improving his/her understanding of the entire overview of the itinerary. Thus, an itinerary can be efficiently prepared.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An itinerary preparing system for preparing a travel plan based on input information, comprising:

input means for entering travel plan information which includes an intended travel time taken from start to end of a trip;

acquiring means for obtaining an expected consumption time of the trip in accordance with said travel plan information;

excess/shortage determining means for comparing said intended travel time with said expected consumption time of the trip to determine an excess or shortage of said expected consumption time relative to said intended travel time; and plan changing means for revising the itinerary, when said excess/shortage determining means finds said excess or shortage, by changing said intended travel time so that the excess or shortage can be offset.

2. An itinerary preparing system according to claim 1, wherein said travel plan information includes visiting place information consisting of the number of places to visit during the trip and a length of stay at each place; and said plan changing means prepares the itinerary by changing at least one of the number of visiting places and lengths of stays thereat.

3. An itinerary preparing system according to claim 2, wherein said visiting place information includes a plurality of visiting places and a length of stay thereat, the system further comprising priority setting means for setting priority to each of said visiting places, wherein said plan changing means prepares the itinerary at least either by reducing the length of stay at at least one of the visiting places having lower priority, or deleting at least one of such places from the itinerary, when said excess/shortage determining means finds said excess of said expected consumption time relative to said intended travel time.

4. An itinerary preparing system according to claim 2, wherein said plan changing means includes supplementary schedule presenting means for presenting a schedule when said excess/shortage determining means finds a shortage of said expected consumption time relative to said intended travel time of the trip.

5. An itinerary preparing system according to claim 2, wherein said visiting place information includes facility type information in which the visiting places are sorted by facility types, the system further comprising searching means for searching the visiting places in accordance with said facility types, wherein after the itinerary is prepared using said facility types, the system presents details of the visiting places corresponding to the facility type.

6. An itinerary preparing system according to claim 1, wherein said travel plan information includes start and end time of the trip, and said plan changing means prepares the itinerary by changing at least one of the start time and the end time of the trip.

7. An itinerary preparing system according to claim 1, further comprising an output device for outputting a prepared itinerary.

8. An itinerary preparing system according to claim 7, wherein said output device displays individual contents of the itinerary by putting a mark indicating each revised item.

9. The itinerary preparing system of claim 1, wherein said travel plan information includes road information to be used during said trip and said plan changing means revises the itinerary by changing roads to be used.

10. A program storage device readable by a machine, tangibly embodying a program of instructions executable by the machine to perform method steps for making an itinerary, said method steps comprising steps of:

1) receiving travel plan information which includes an intended travel time taken from start to end of a trip;

2) obtaining an expected duration of the trip in accordance with the travel plan information;

3) comparing the intended travel time with the expected duration of the trip to determine an excess or shortage of the expected duration relative to the intended travel time; and 4) when the determining step finds said excess or shortage, changing the intended travel time so that the excess or shortage can be offset.

* * * * *